United States Patent [19]

Jolly

[11] Patent Number: 4,605,291
[45] Date of Patent: Aug. 12, 1986

[54] CATHODE RAY TUBE SCREEN VIEWING AID

[76] Inventor: Thomas A. Jolly, 352 Loma Vista, El Segundo, Calif. 90245

[21] Appl. No.: 664,165

[22] Filed: Oct. 24, 1984

[51] Int. Cl.$^4$ .......................... G02B 7/18; G02B 17/06
[52] U.S. Cl. ..................................... 350/623; 358/250
[58] Field of Search ............... 350/623, 624, 618, 626, 350/602, 622; 358/250, 254, 231, 226; 248/474, 480, 479, 476

[56] References Cited

U.S. PATENT DOCUMENTS

| | | | |
|---|---|---|---|
| 1,584,938 | 5/1926 | Higbee | 350/623 |
| 1,983,108 | 12/1934 | Verdich | 350/623 |

FOREIGN PATENT DOCUMENTS

| | | | |
|---|---|---|---|
| 1195227 | 11/1959 | France | 350/623 |
| 1550184 | 12/1968 | France | 350/623 |
| 567520 | 2/1945 | United Kingdom | 350/623 |

Primary Examiner—Jon W. Henry
Attorney, Agent, or Firm—Edward A. Sokolski

[57] ABSTRACT

A pair of mirrors are mounted upon a support frame in front of a cathode ray viewing screen so as to double reflect the images on the screen so that they can be viewed looking downwardly rather than directly at the screen. A support member is provided for the mirrors which enables individual relative adjustment of such mirrors both towards and away from the screen as well as vertically and angularly relative to the screen. This end result is achieved by means of adjustable support rods which fit through elongated slots formed in the support frame as well as elongated slots formed in the mounts for the mirrors. In one embodiment the viewer assembly is supported on top of the CRT assembly with a balancing counterweight being employed to counterbalance the weight of the mirrors and their associated support members. In another embodiment a stand is provided for supporting the viewing aid in front of the screen.

14 Claims, 9 Drawing Figures

CATHODE RAY TUBE SCREEN VIEWING AID

This invention relates to optical reflecting devices and more particularly to such a device employing double reflecting mirrors which is suitable for use in viewing a cathode ray tube viewing screen.

Many devices have been developed utilizing double reflecting mirrors for various viewing purposes. These include for example a device for use in spectacles described in U.S. Pat. No. 3,058,392; a device for use in a welders helmet which is described in U.S. Pat. No. 1,885,744; a device for use as a viewer by a person in a reclining position described in U.S. Pat. No. 3,019,689; a device for use in a vehicle as described in U.S. Pat. No. 2,197,280 and a device for facilitating the adjustment of a television set described in U.S. Pat. No. 3,498,696.

The device of the present invention is a special adaptation of the use of double reflecting mirrors for use in facilitating the viewing of a cathode ray viewing screen such as for example in the operation of a word processor or computer. In such viewing it has been found that in many situations the operator is obliged to look upwardly above the horizontal in order to view the screen. A prolonged viewing in this position is likely to cause soreness in the back, neck and shoulders resulting in headaches, eyestrain and general fatigue. Such problems are particularly accentuated where the operator wears bifocal eyeglasses in which situation the wearer is forced to bend the neck sharply in order to bring the lower element of the bifocal lens set in a position for viewing the screen.

The desired end result in the present invention is achieved by mounting a pair of reflecting mirrors on a support frame so that they can independently be adjustably positioned towards and away from the viewing screen; vertically relative to the viewing screen; and angularly relative to the viewing screen. This is achieved by employing elongated slots in the support members along with elongated slots in the mirror mounts in which rods are fitted, these rods having locking and positioning knobs mounted thereon which are used to position and lock the mirrors in place on the support frame in desired positions.

In one embodiment of the invention, the support frame is positioned on top of the cathode ray tube viewer assembly and retained in this position by means of a counterweight which counterbalances the weight of the mirrors and their associated support assemblies. In another embodiment of the invention, the support members are mounted on a self standing support stand which straddles the computer or word processor keyboard.

It is therefore an object of this invention to facilitate the viewing of a cathode ray tube viewing screen by an operator of a computer, word processor or the like.

It is a further object of this invention to lessen fatigue and muscle and eye strain in the prolonged viewing of cathode ray tube viewing screens by computer and word processor operators employing such equipment.

Other objects of the invention will become apparent as the description proceeds in connection with the accompanying drawings of which:

Figure 1:
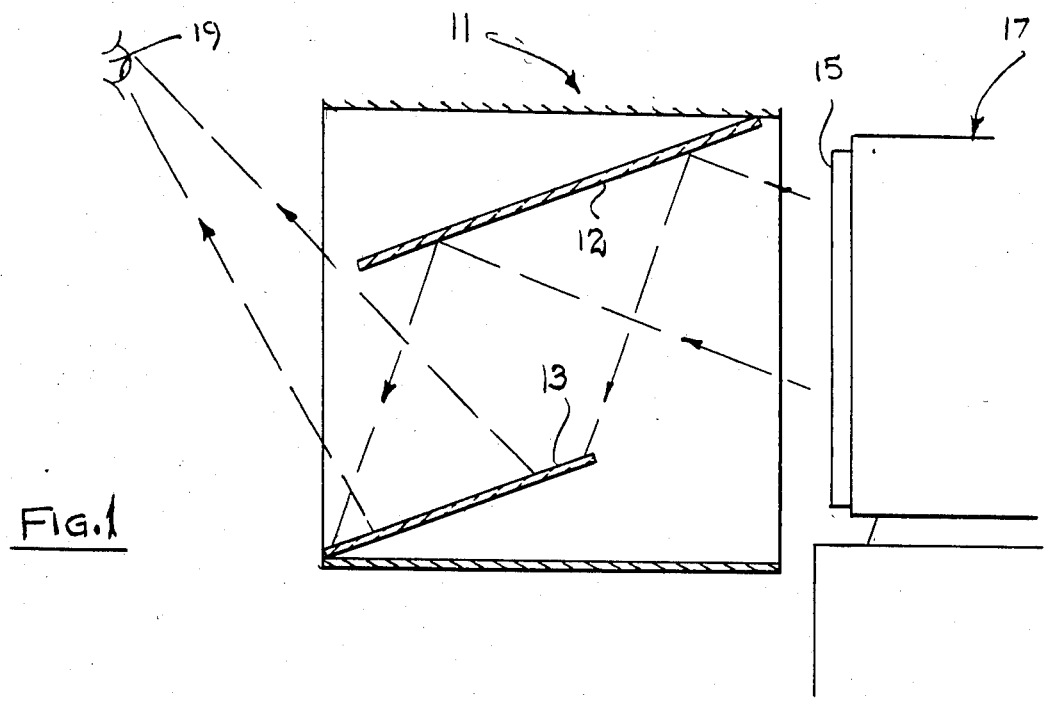
FIG. 1 is a schematic drawing illustrating the operation of the device of the invention.

Referring now to FIG. 1 the operation of the device of the invention is schematically illustrated. The device comprises a support frame 11 which supports a pair of reflecting mirrors 12 and 13 mounted on the support frame for positional adjustment relative to each other. The support frame 11 is mounted by suitable support means, to be described further on in the specification, in front of the viewing screen 15 of the cathode ray tube (CRT) display device 17.

Mirrors 12 and 13 are positioned relative to each other and to screen 15 so as to double reflect the images on the screen as indicated by the light beam arrows in the drawing so as to provide an image for the eye 19 of a viewer.

The image on screen 15 are typically of the alphanumeric or pictorial type such as provided in a word processor or computer display. As can be seen, in view of the double reflection of the image such image appears to the eye precisely as it appears on the screen with the eye and viewer's head positioned for downward viewing.

Referring now to FIGS. 2 and 4–7, a first embodiment of the invention is illustrated. Support frame 11 has a pair of oppositely positioned plates 21 and 22 between which mirror assemblies 19 and 23 are adjustably supported. Mirror support assemblies 19 and 23 each has a reflecting mirror 24 and 25 respectively mounted thereon by means of support strips 27 which are attached to the main bodies of the assemblies by means of screws 28. Thus the mirrors are held in position by the strips and can be removed if necessary for replacement merely by unscrewing screws 28. The mirror assemblies 19 and 23 have elongated slots 29a–29c formed therein the lower assembly 19 having a single slot 29a while the upper assembly 23 has a pair of slots 29b and 29c. Side plates 21 and 22 have a plurality of elongated slots 21a–21c and 22a–22c formed therein respectively.

Rectangular frame 35 has a plurality of apertures 36 formed in the side runners 35a and 35b thereof the apertures of these side frames being positioned directly opposite each other. A counterweight member 38 is mounted on end cross member 35c of frame 35 by means of screws 40.

Mirror assembly 23 is adjustably supported on side plates 21 and 22 by means of rods 40 and 41 which are fitted through the slots 21a, 22a, and 21b, 22b on the side plates 21 and 22; and the slots 29b and 29c of mirror assembly 23 respectively. Rods 40 and 41 are threaded on the opposite ends thereof and are adjustably held in a desired set position by means of knurled knobs 45 which threadably engage the rods. Thus, it can be seen that mirror assembly 23 can be adjusted vertically along slots 21a, 21b, 22 a and 22b as well as angularly relative to side plates 21 and 22. Further the mirror assembly can be adjusted laterally along slots 29b and 29c as may be desired.

Rod 42 which is similar to rods 40 and 41 is fitted through slots 21c and 22c in the side plates as well as slot 29a in the mirror assembly and is adjustably locked in a desired position by means of knurled knobs 45 which in their tightened positions bring the sides of the mirror assemblies into tight abutment against plates 21 and 22. The lower mirror assembly 19 can, as for the first mirror assembly, be adjusted vertically and pivotally in slots 21c and 22c and laterally in the mirror assembly slot 29a and locked in position as for the upper assembly by tightening knobs 45.

Figure 2:
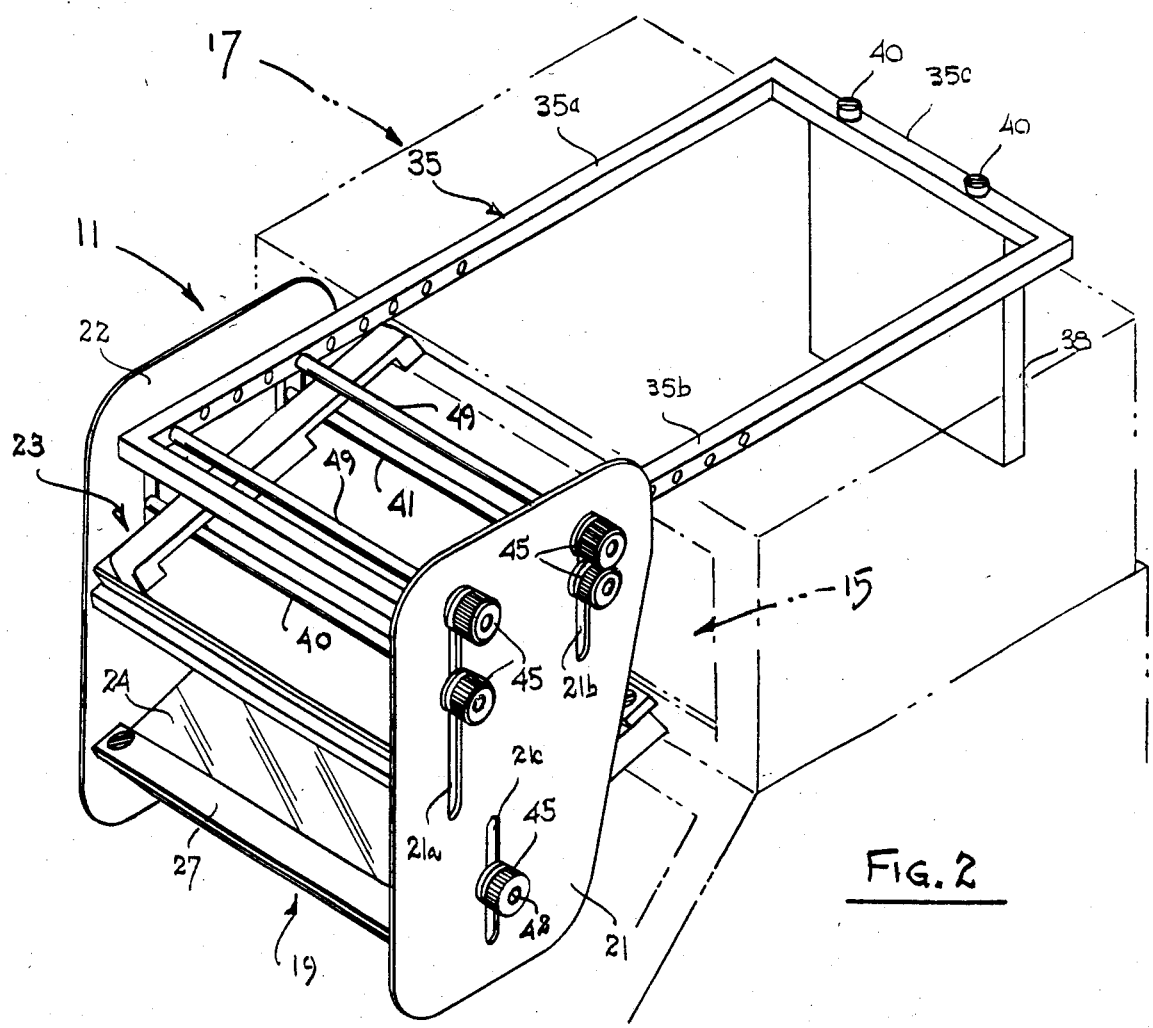
FIG. 2 is a perspective view of a first embodiment of the invention.

The device is mounted in place in front of the cathode ray tube display screen 15 as shown in FIG. 2 with the side arms 35a and 35b of the frame supported on the top of the viewer assembly 17 and with counterweight member 38 serving to counterbalance the weight of the forward portions of the mirror assembly so that the entire assembly is balanced in place as shown in the figure. As can be seen, the mirror assemblies can be positioned fore or aft, as may be required, by utilizing various pairs of opposing apertures 36 for supporting the unit on rods 49 which pass through these apertures as well as slots 21a, 21b and 22a, 22b in the side plates. Rods 49 are similar in construction to Rods 40–42, being threaded at their opposite ends. Knobs 45 similar to the knobs used with rods 40–42 threadably engage the ends of rods 49 and are tightened against side plates 21 and 22 to secure the side plates to frame 35.

The device of the invention thus can be adjusted to accommodate various viewing screens and operating personnel to provide the needed viewing capability to enable viewing of the screen with the viewers head tilted downwardly.

Figure 3:
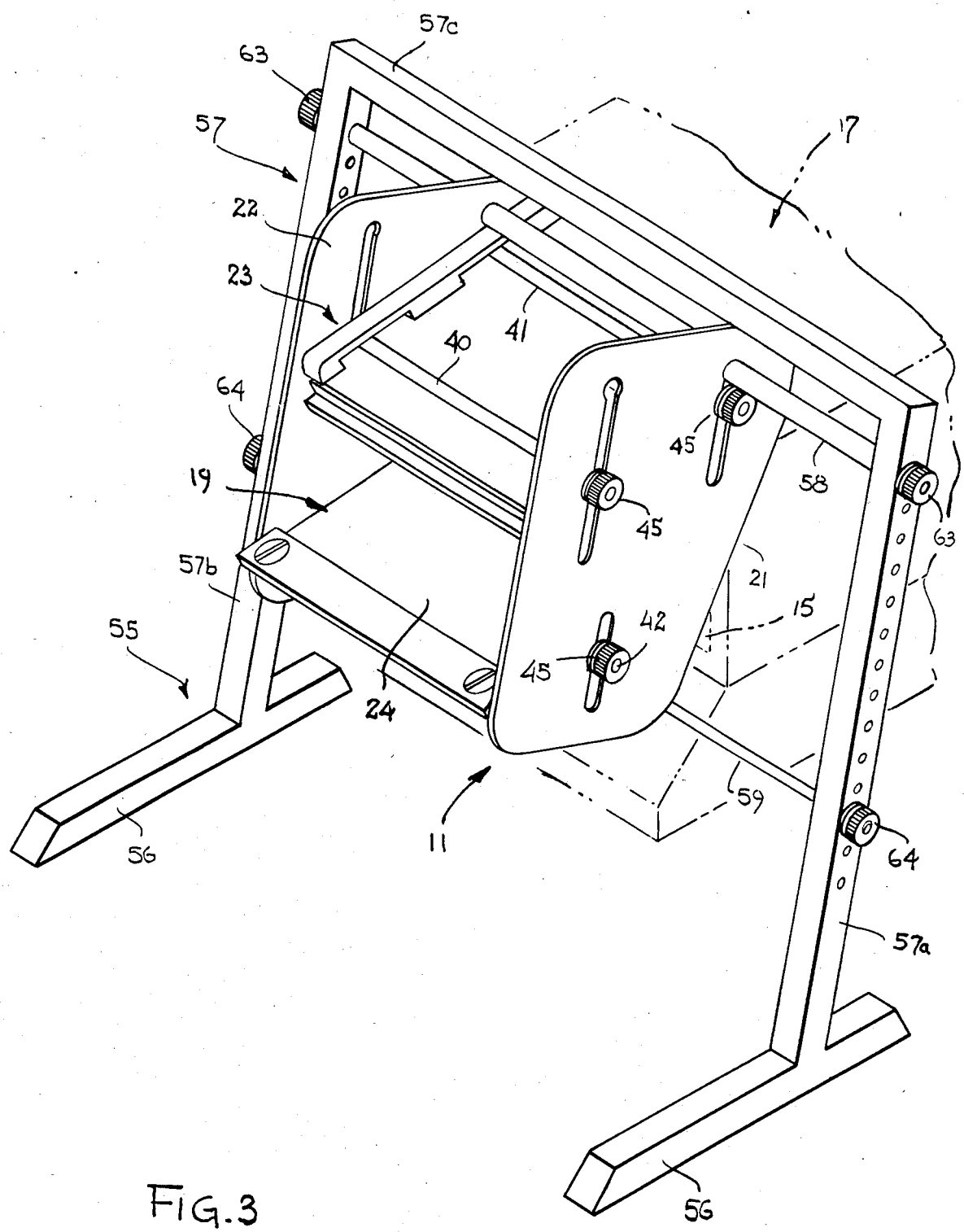
FIG. 3 is a perspective view of a second embodiment of the device of the invention.
Figure 4:
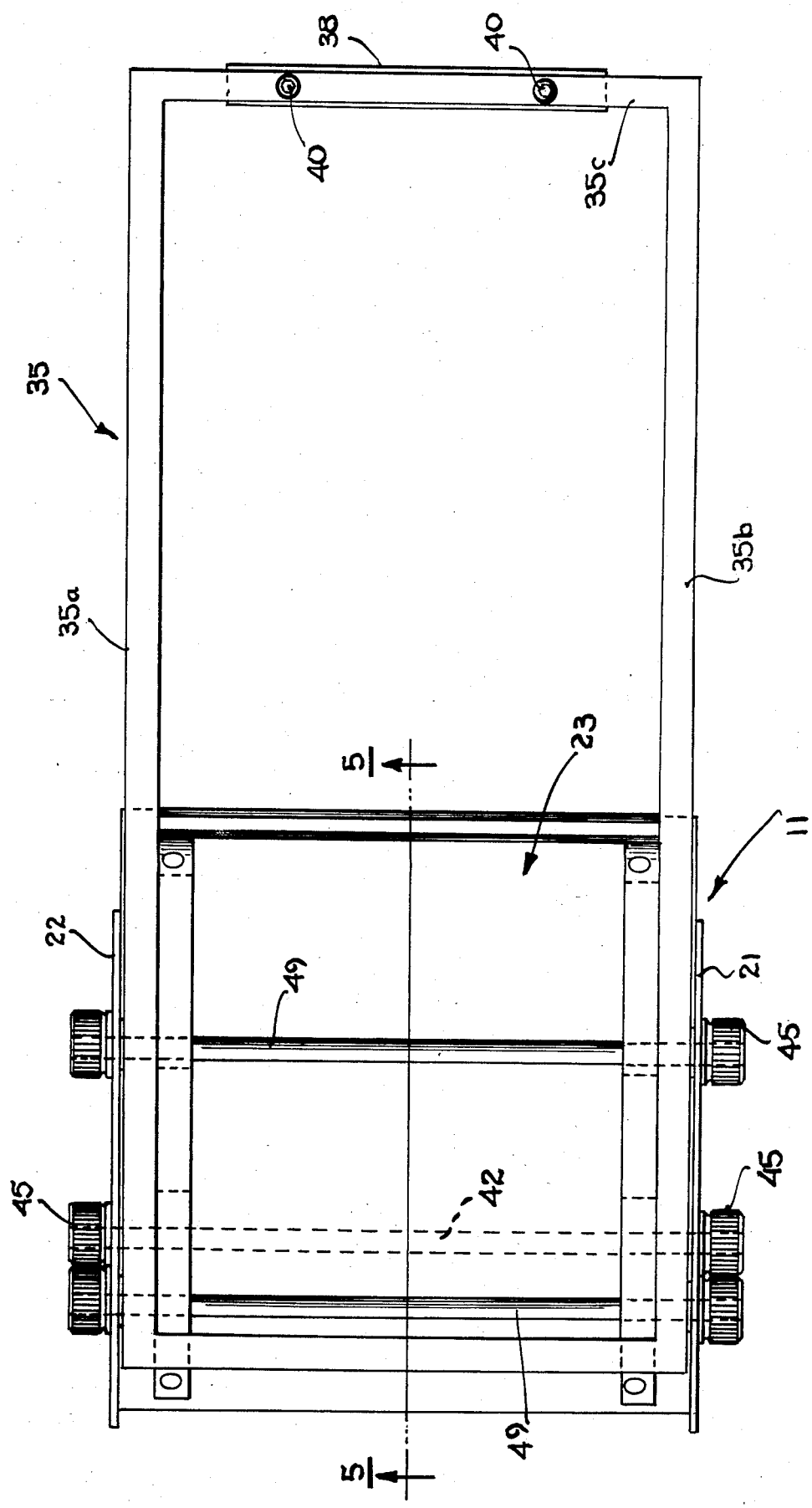
FIG. 4 is a top plan view of the first embodiment.
Figure 5:
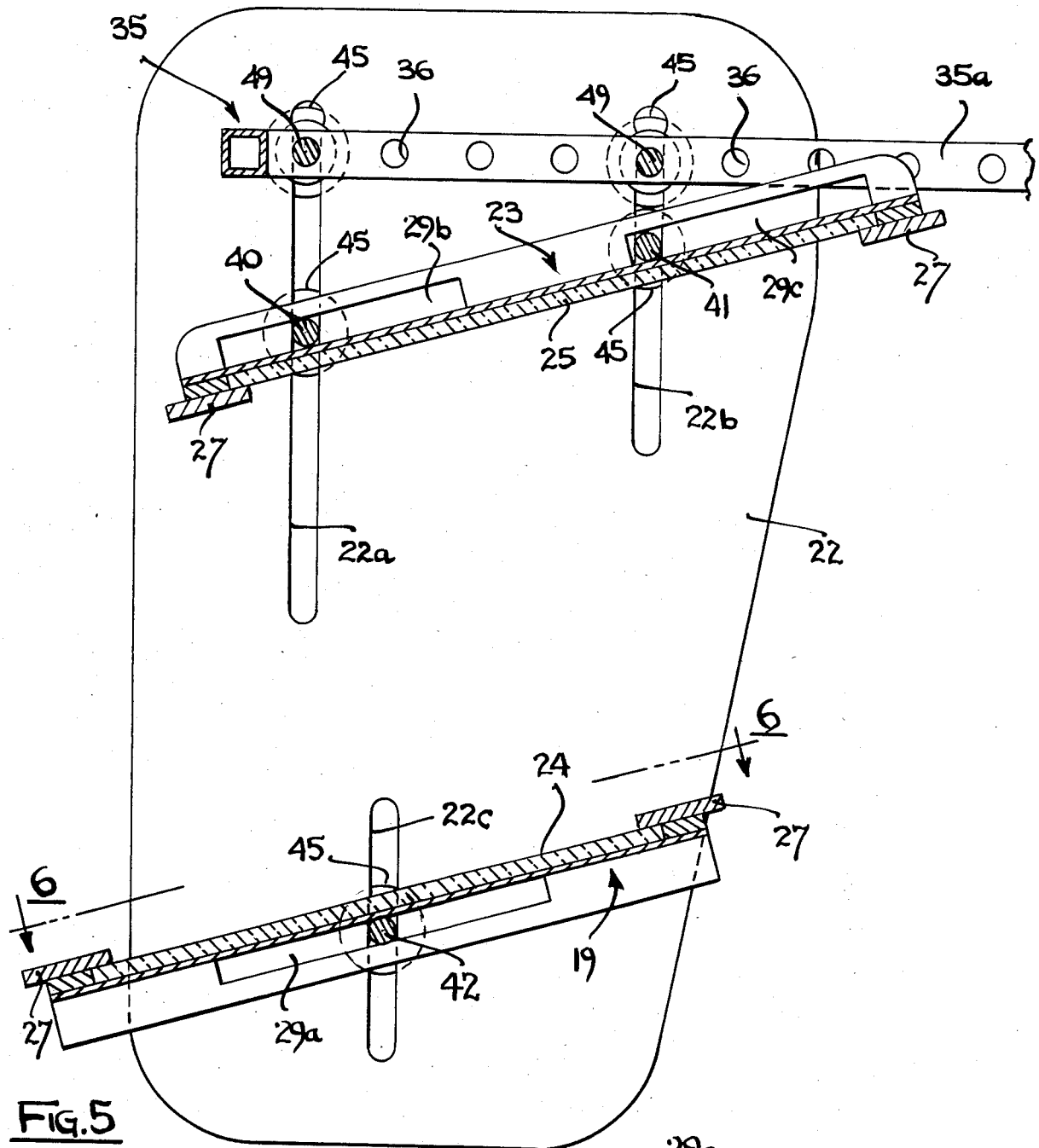
FIG. 5 is a cross-sectional view taken along the plane indicated by 5—5 in FIG. 4.
Figure 6:
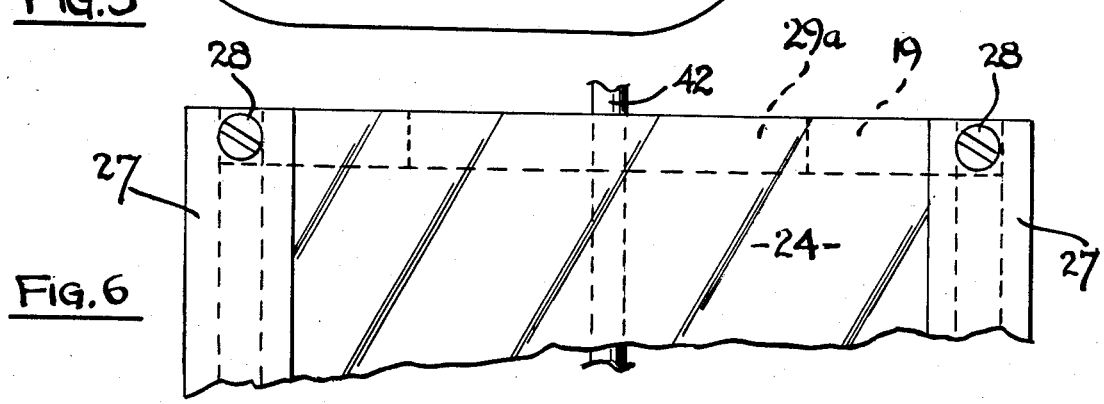
FIG. 6 is a view with partial cutaway section taken along the plane indicated by 6—6 in FIG. 5.
Figure 7:
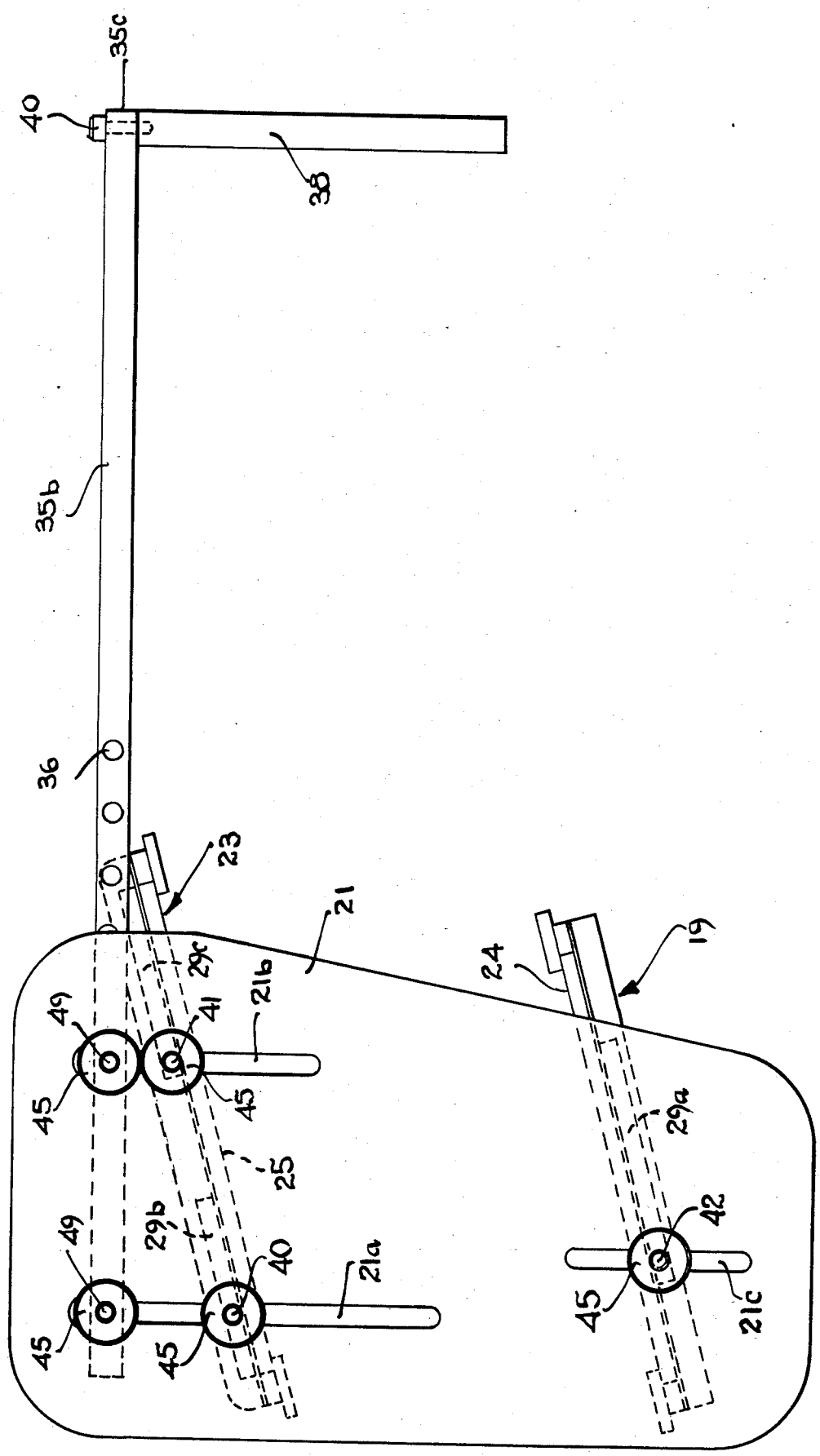
FIG. 7 is a side elevational view of the first embodiment.
Figure 8:
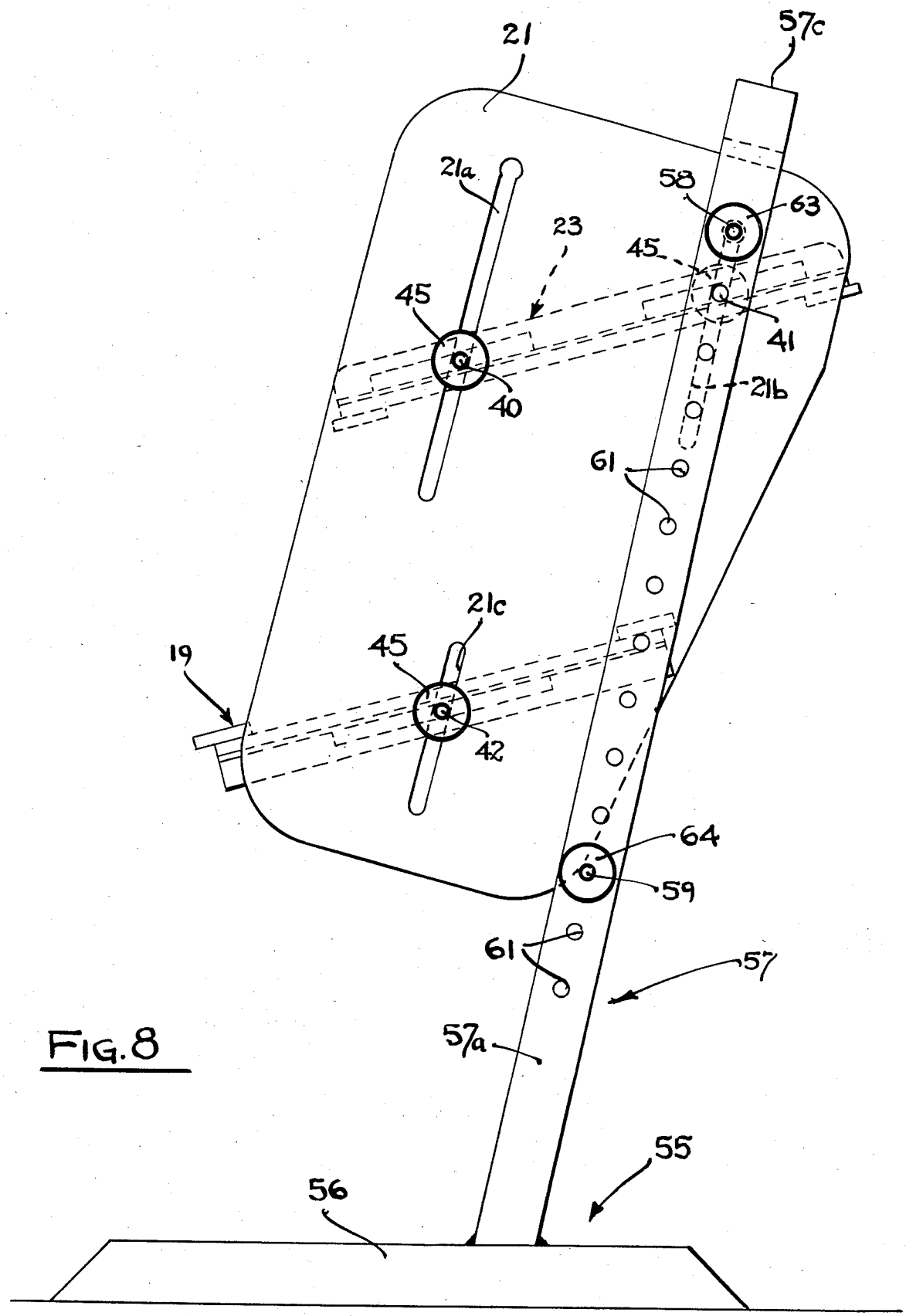
FIG. 8 is a side elevational view of a second embodiment of the invention.
Figure 9:
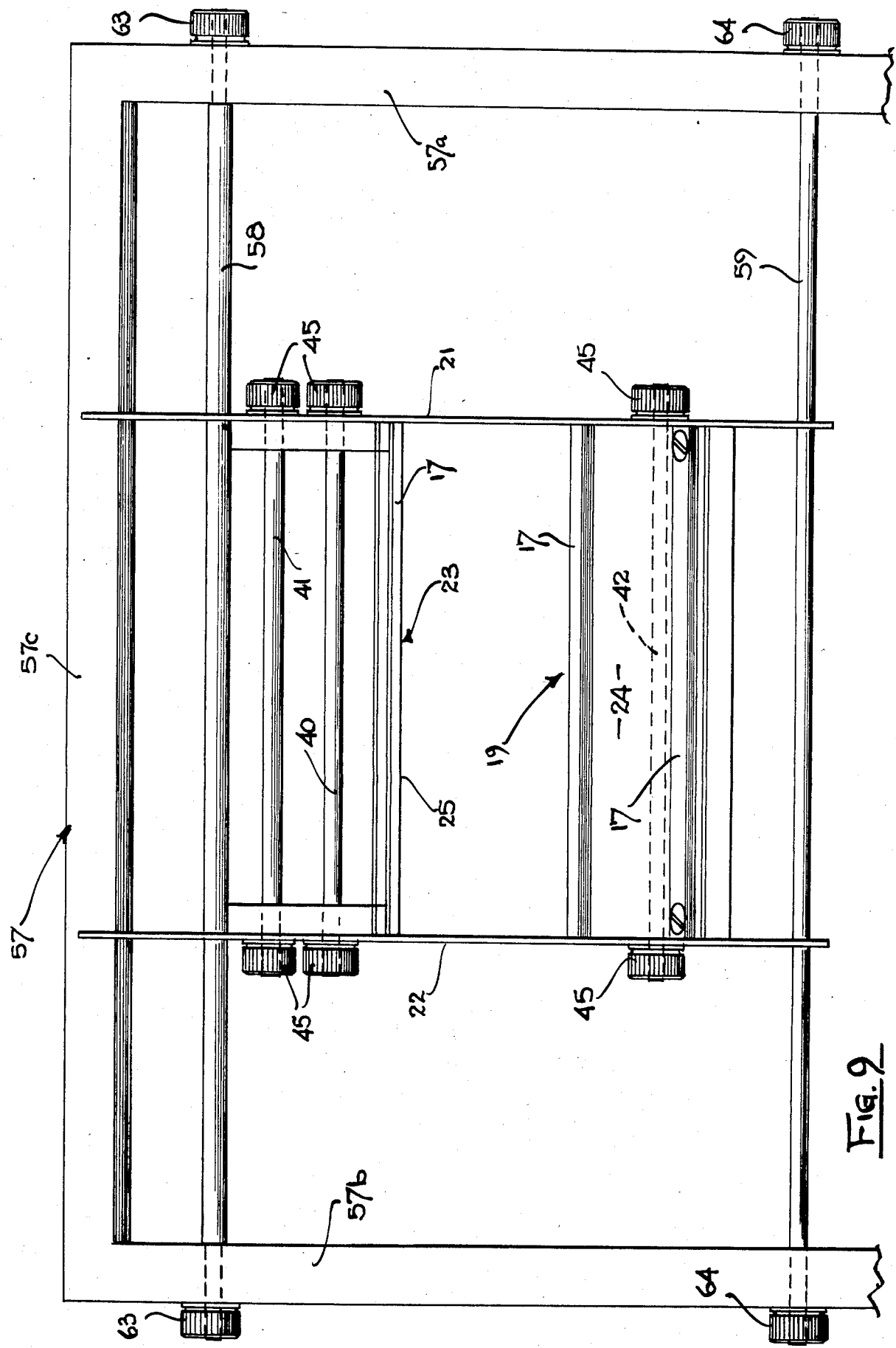
FIG. 9 is a front elevational view of the second embodiment.

Referring now to FIGS. 3, 8, and 9 a second embodiment of the invention is illustrated. This embodiment is suitable for use in situations where it is impossible to support the viewing unit on the top of the CRT assembly, such as for example, where the viewing assembly is mounted in a console or where the top of such assembly is otherwise unavailable for the type of mounting of the first embodiment. The viewing assembly including the side plates 21 and 22, the mirror assemblies 19 and 23 and the mounting rods 40–42 and locking knobs 45 are identical with corresponding elements of the first embodiment the only difference lying in the free standing mounting stand 55 which is employed. This stand has a base 56 and an upstanding frame 57 which includes side arms 57a and 57b joined together by a top cross arm 57c. The viewer unit is supported on side arm portion 57a and 57b by means of rods 58 and 59 which are similar to rods 40–42 and are threaded at their opposite ends. Arms 57a and 57b have a series of paired opposing apertures 61 formed therein through which rods 58 and 59 can be fitted as may be desired to provide the proper elevation for the mirrors of the viewing unit. Rod 58 fits through elongated slots 21b and 22b formed in the side plates as well as the selected apertures 61 while rod 59 fits only through the selected paired apertures 61. The viewing assembly thus can be raised or lowered along side portions 57a and 57b of the stand to a desired position for viewing and locked in this position by means of knurled knobs 63. The lower rod 59 abuts against the edges of plates 21 and 22 and acts as a brace for the viewer. The rod once set in the desired paired apertures 61 is locked in position by means of knurled knobs 64.

While the invention has been described and illustrated in detail, it is clearly to be understood that this is intended by way of illustration example only and is not intended by way of limitation, the spirit and scope of this invention being limited only by the terms of the following claims.

I claim:

1. A viewing device for facilitating the viewing of images on a screen comprising
   first and second reflecting mirrors,
   support means, and
   means for adjustably mounting said mirrors on the support means for vertical, lateral and pivotal positioning relative to each other and said screen so as to double reflect the screen images to a desired convenient viewing point comprising a support assembly for supporting each of said mirrors, a pair of oppositely positioned side plates having elongated opposing slots formed therethrough, and means for supporting said support assemblies for selective positioning along said slots and pivotally relative to said plates.

2. The viewing device of claim 1 wherein said mirror support assemblies have elongated slots formed therein, said means for supporting the mirror support assemblies comprising rod means fitted through the slots in the side plates and the slots of said support assemblies for supporting the mirror support assemblies for adjustable positioning along said slots and pivotally relative to each other.

3. The viewing device of claim 2 wherein said rod means comprises a plurality of rods threaded at the opposite ends thereof and knob means threadably attached to the threaded rod ends for securing the mirror support assemblies to the side plates in selected positions.

4. The viewing device of claim 1 and further including a support frame having oppositely positioned arms and means for adjustably positioning and mounting the side plates between the arms.

5. The viewing device of claim 4 and further including a counterweight mounted between said arms for counterbalancing the weight of the mirrors, mirror support assemblies and side plates.

6. The viewing device of claim 4 and further including a plurality of oppositely positioned apertures formed in said oppositely positioned arms, said means for positioning and mounting the side plates between the arms comprising rod means fitted through selected pairs of said apertures and the slots of said side plates.

7. The viewing device of claim 6 wherein the opposite ends of said rod means are threaded and further including knob means for removably securing the plates to said arms.

8. The viewing device of claim 4 and further including a support stand for supporting said arms.

9. A viewing device for facilitating the viewing of the screen of a CRT display device comprising
   a pair of reflecting mirrors,
   a support assembly for supporting each of said mirrors, each of said support assemblies having an elongated slot formed therethrough and running in a direction substantially parallel to the surface of the associated mirror,
   a pair of opposing side plates having oppositely positioned elongated slots formed therethrough,
   rod means fitted through the slots in the side plates and the slots in the mirror support assemblies for adjustably supporting the mirror assemblies on the side plates for pivotal, longitudinal and lateral adjustment relative to the side plates, to each other and to the CRT screen, and means for adjustably supporting the side plates so as to position the mirrors opposite the CRT screen.

10. The viewing device of claim 9 wherein the rod means comprises a plurality of rods each being threaded at the opposite ends thereof and knob means threadably engaging the rod ends for removably securing the mirror assemblies to the side plates in a selected positions.

11. The viewing device of claim 9 wherein the means for adjustably supporting the side plates comprises a support frame having opposing side arms with a plurality of oppositely positioned apertures formed therethrough, rod means fitted through selected pairs of said apertures and said side plate slots, the opposite ends of said rod means being threaded, and knob means threadably engaging the rod means ends for securing the side plates to the side arms of the support frame.

12. The viewing device of claim 11 and further including a counterweight mounted between said side arms towards one end of the support frame for counterbalancing the weight of the side plates, mirrors and mirror support assemblies, the side arms being supported on said CRT display device.

13. The viewing device of claim 9 wherein the means for adjustably supporting the side plates comprises a stand having a base and an upstanding frame extending from the base, said frame having a plurality of opposing apertures formed therethrough, rod means fitted through the slots in the side plates and selected pairs of opposing apertures in the side arms, and means for removably securing the side plates to the side arms.

14. The viewing device of claim 13 wherein the means for securing the side plates to the side arms comprises threaded knobs, said rod means comprising a plurality of rods which are threaded at the opposite ends thereof, said knobs threadably engaging the opposite ends of said rods.

* * * * *